United States Patent [19]

Menyailo et al.

[11] 3,728,384
[45] Apr. 17, 1973

[54] METHOD OF PRODUCING 1,8-NAPHTHALDEHYDE MONOCARBOXYLIC

[75] Inventors: Anatoly Tikhonovich Menyailo; Inna Evgenievna Pokrovskaya; Mikhail Valerievich Pospelov; Antonina Karpovna Yakovleva, all of Moscow, U.S.S.R.

[73] Assignee: Nauchno-Issledovatelsky institut sinteticheskikh spirtov, Moscow, U.S.S.R.

[22] Filed: July 24, 1970

[21] Appl. No.: 58,209

[52] U.S. Cl. .......................... 260/523 R, 260/610 R
[51] Int. Cl. .................................................. C07c 51/34
[58] Field of Search ...................... 260/523 R, 610 R

[56] References Cited

UNITED STATES PATENTS 2,966,513  12/1960  Fields ............................... 260/523
3,284,492  11/1966  Fremery et al. ..................... 260/523
3,118,934  1/1964   Callighan et al. ................... 260/523

*Primary Examiner*—Henry R. Jiles
*Assistant Examiner*—R. S. Weissberg
*Attorney*—Waters, Roditi, Schwartz & Nissen

[57] ABSTRACT

A method of producing 1,8-naphthaldehyde monocarboxylic acid, characterized in that acenaphthylene is ozonized in the medium of a lower aliphatic alcohol, or in a mixture of a lower aliphatic alcohol with water, or in a mixture of an aliphatic ketone with water, in the presence of an alkaline earth metal hydroxide. The resulting reaction mass is treated with hydrochloric acid, the formed 1,8-naphthaldehyde monocarboxylic acid is separated from the alkaline earth metal hydroxide and washed to remove the traces of hydrochloric acid.

12 Claims, No Drawings

METHOD OF PRODUCING 1,8-NAPHTHALDEHYDE MONOCARBOXYLIC

The present invention relates to methods of producing 1,8-naphthaldehyde monocarboxylic acid.

1,8-Naphthaldehyde monocarboxylic acid can easily be converted to 1,8-naphthalene dicarboxylic acid and to 1,8-naphthalene dicarboxylic acid anhydride which find wide application in the production of synthetic resins and fast dyestuffs for various fibers, as well as in producing plasticizers. Plasticizers based on 1,8-naphthalene dicarboxylic acid feature high thermostability and low volatility.

A method of producing 1,8-naphthaldehyde dicarboxylic acid by ozonization of acenaphthylene is known. The process is carried out in the medium of carbon tetrachloride or butyl alcohol at temperatures below zero. The reaction proceeds with the formation of explosion-hazardous peroxide products: alpoxy hydroperoxides, ozonides, polymer peroxides. These peroxide products are separated and decomposed by special treatment during 10–12 hours with glacial acetic acid and potassium iodide, and the resulting 1,8-naphthaldehyde monocarboxylic acid is isolated with a yield of 49.9 wt. percent of the theoretical amount.

Said method is a multistage one, it proves to be technologically complicated, and is associated with the liberation of explosion-hazardous products, which limits the industrial uses of the above-discussed method.

It is an object of the present invention to improve the method of producing 1,8-naphthaldehyde monocarboxylic acid by carrying out the ozonization of acenaphthylene in such a manner that the desired product can be produced without the liberation of explosion-hazardous peroxide compounds, and thus to make the process fit for industrial uses.

Said object is accomplished by the provision of a method of producing 1,8-naphthaldehyde monocarboxylic acid by ozonization of acenaphthylene, which, according to the invention, is carried out in a lower aliphatic alcohol, or in a mixture of a lower aliphatic alcohol with water, or in a mixture of a lower aliphatic ketone with water, in the presence of a hydroxide of an alkaline-earth metal, the latter being taken in an amount sufficient for the decomposition of peroxide compounds formed during the reaction. The reaction mass obtained after the ozonization is treated with hydrochloric acid to separate the resulting 1,8-naphthaldehyde monocarboxylic acid from the alkaline-earth metal hydroxide.

Other mineral acids are not suitable for this purpose. Thus, for example, sulfuric acid forms an insoluble residue with the hydroxide of an alkaline-earth metal, and this involves difficulties in the separation of the desired product. Nitric acid is corrosive for the equipment and affects the quality of the 1,8-naphthaldehyde monocarboxylic acid.

The separated 1,8-naphthaldehyde monocarboxylic acid is washed to remove traces of hydrochloric acid and then, if necessary, recrystallized. The process is carried out at room temperature and atmospheric pressure. The reaction is of a selective nature and proceeds according to the equation:

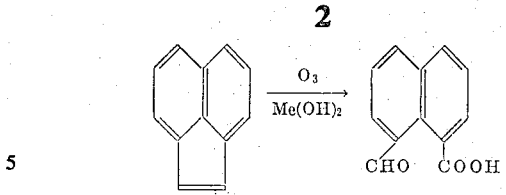

where Me is an alkaline-earth metal.

For a better decomposition of peroxide compounds formed in the course of ozonization of acenaphthylene, it is recommended that 0.5 to 1.5 parts by weight of an alkaline-earth metal hydroxide should be taken per part by weight of acenaphthylene. As an the alkaline-earth metal hydroxide use may be made of barium hydroxide, calcium hydroxide, or magnesium hydroxide.

The ozonization of acenaphthylene should be carried out in the medium of a lower aliphatic alcohol, such as ethyl, methyl, propyl or butyl alcohol, or in an aqueous-alcoholic medium, that is, in a mixture of said alcohol with water. In the latter case the weight water-to-alcohol ratio of 1:10 is preferable. In case the ozonization is carried out in a water-ketone medium, the weight ratio may be 1:2–3 respectively. As the aliphatic ketone use may be made of acetone, methyl ethyl ketone, and other water-soluble ketones.

Usually the separated 1,8-naphthaldehyde monocarboxylic acid is washed with water, but any other appropriate solvent, such as butyl alcohol, may also be used.

For obtaining a higher-purity product, 1,8-naphthaldehyde monocarboxylic acid is recrystallized from benzene or toluene. The temperature of the recrystallized product is 169°–170° C.

As can be seen from the present specification, the herein proposed method of producing 1,8-naphthaldehyde monocarboxylic acid is simple and safe for industrial realization, since explosion-hazardous compounds formed in the course of ozonization are decomposed directly in the reaction mixture in the presence of an alkaline-earth metal. Therefore the stage of isolation of said explosion-hazardous compounds is obviated, and the process is thus simplified. Moreover, the present invention provides for an almost twofold increase in the yield of the desired product, as compared with the method known heretofore.

Given hereinbelow are illustrative examples of carrying out the method of the invention.

Example 1

A reactor equipped with a stirrer, a condenser and a gas feed tube is charged with 20 g of acenaphthylene, 60 g of water 200 ml of acetone and 35 g of calcium hydroxide. Then oxygen containing 2 to 5 percent of ozone is passed through the resulting suspension under intensive stirring and at room temperature. No peroxide products are present in the reaction mixture, the content of active oxygen in weight percent being zero. The precipitate is filtered, washed with acetone to remove traces of acenaphthylene, and dissolved in a weak solution of hydrochloric acid. The precipitated 1,8-naphthaldehyde monocarboxylic acid is filtered, washed with water to remove traces of hydrochloric acid, and recrystallized from benzene or toluene. M.P. of the recrystallized product is 169°–170° C. The yield of 1,8-naphthaldehyde monocarboxylic acid is 24.5 g (98 percent of the theoretical amount).

EXAMPLE 2

Acenaphthylene is ozonized as described in Example 1, but in the presence of 35 g of barium hydroxide. The reaction mixture is treated by following the procedure described in Example 1. The yield of 1,8-naphthaldehyde monocarboxylic acid is 94 percent of the theoretical amount.

EXAMPLE 3

Acenaphthylene is ozonized as described in Example 1, but in the presence of 35 g of magnesium hydroxide. The reaction mass is treated by following the procedure described in Example 1. The yield of 1,8-naphthaldehyde monocarboxylic acid is 23 g (87 percent of the theoretical amount).

EXAMPLE 4

A reactor similar to that described in Example 1 is charged with 20 g of acenaphthylene, 60 g of water, 200 ml of acetone; then 20 g of barium hydroxide are added thereto. The ozonization and treatment of the reaction products are carried out as described in Example 1. The yield of 1,8-naphthaldehyde monocarboxylic acid is 24.2 g (92 percent of the theoretical amount).

EXAMPLE 5

A reactor similar to that described in Example 1 is charged with 20 g of acenaphthylene, 60 g of water, 200 ml of acetone, and 10 g of barium hydroxide. The ozonization and treatment of the reaction products are carried out as described in Example 1. The yield of 1,8-naphthaldehyde monocarboxylic acid is 22.4 g (85 percent of the theoretical amount).

EXAMPLE 6

20 g of acenaphthylene in 200 g of methyl alcohol are ozonized in the presence of 20 g of barium hydroxide. The reaction products are treated as described in Example 1. The yield of 1,8-naphthaldehyde monocarboxylic acid is 20.5 g (78 percent of the theoretical amount).

EXAMPLE 7

Acenaphthylene is ozonized as described in Example 6, but in the medium of 200 g of ethyl alcohol. The yield of 1,8-naphthaldehyde monocarboxylic acid is 21 g (80 percent of the theoretical amount).

EXAMPLE 8

20 g of acenaphthylene are ozonized as described in Example 1, but in the medium of 200 g of propyl alcohol. The yield of 1,8-naphthaldehyde monocarboxylic acid is 21.5 g (82 percent of the theoretical amount).

EXAMPLE 9

Acenaphthylene is ozonized by following the procedure described in Example 6, but in the medium of 200 g of butyl alcohol. The yield of 1,8-naphthaldehyde monocarboxylic acid is 22.4 g (85 percent of the theoretical amount).

EXAMPLE 10

A reactor similar to that described in Example 1 is charged with 20 g of acenaphthylene, 20 g of water, 200 g of butyl alcohol and 20 g of calcium hydroxide. Through the resulting suspension oxygen containing 5 percent of ozone is passed till the ozone breakthrough.

The precipitate is filtered, washed with hot butyl alcohol to remove traces of acenaphthylene. Further treatment of the reaction products is carried out by following the procedure as described in Example 1. The yield of 1,8-naphthaldehyde monocarboxylic acid is 23.6 g (90 percent of the theoretical amount).

What is claimed is:

1. A method of producing 1,8-naphthaldehyde monocarboxylic acid comprising ozonizing acenaphthylene room temperature and atmospheric pressure in the medium of a lower aliphatic alcohol, or in a mixture of said alcohol with water, or in a mixture of a lower aliphatic ketone with water, in the presence of an alkaline earth metal hydroxide which is taken in an amount sufficient for the decomposition of those peroxide compounds which form during the reaction; treating the resulting reaction mass with hydrochloric acid to separate the formed 1,8-naphthaldehyde monocarboxylic acid from the alkaline earth metal hydroxide; and washing the 1,8-naphthaldehyde monocarboxylic acid with water or appropriate solvent to remove traces of hydrochloric acid.

2. A method as claimed in claim 1, wherein 0.5–1.5 parts by weight of an alkaline-earth metal hydroxide are taken per part by weight of acenaphthylene.

3. A method as claimed in claim 1, wherein the ozonization of acenaphthylene is carried out in the presence of barium hydroxide.

4. A method as claimed in claim 1, wherein ozonization of acenaphthylene is carried out in the presence of calcium hydroxide.

5. A method as claimed in claim 1, wherein ozonization of acenaphthylene is carried out in the presence of magnesium hydroxide.

6. A method as claimed in claim 1, wherein the ozonization of acenaphthylene is carried out in a medium consisting of water and a lower aliphatic ketone, said components being taken in a weight ratio of 1:2–3.

7. A method as claimed in claim 6, wherein the lower aliphatic ketone is acetone.

8. A method as claimed in claim 6, wherein the lower aliphatic ketone is methyl-ethyl ketone.

9. A method as claimed in claim 1, wherein the ozonization is carried out in an aqueous-alcoholic medium with the water-to-alcohol weight ratio being 1:10.

10. A method as claimed in claim 1, wherein the aliphatic alcohol is ethyl alcohol.

11. A method as claimed in claim 1, wherein the aliphatic alcohol is propyl alcohol.

12. A method as claimed in claim 1, wherein the aliphatic alcohol is butyl alcohol.

* * * * *